United States Patent
Clark

(10) Patent No.: US 11,699,197 B2
(45) Date of Patent: Jul. 11, 2023

(54) SYSTEM AND METHOD FOR ENERGY FORECASTING BASED ON INDOOR AND OUTDOOR WEATHER DATA

(71) Applicant: Austin J. Clark, Granger, IN (US)

(72) Inventor: Austin J. Clark, Granger, IN (US)

( * ) Notice: Subject to any disclaimer, the term of this patent is extended or adjusted under 35 U.S.C. 154(b) by 0 days.

(21) Appl. No.: 17/300,336

(22) Filed: May 14, 2021

(65) Prior Publication Data

US 2021/0374883 A1    Dec. 2, 2021

Related U.S. Application Data

(60) Provisional application No. 63/026,943, filed on May 19, 2020.

(51) Int. Cl.

| | |
|---|---|
| *G06Q 50/06* | (2012.01) |
| *G05B 15/02* | (2006.01) |
| *G05B 19/048* | (2006.01) |
| *F24F 11/30* | (2018.01) |
| *F24F 130/10* | (2018.01) |
| *F24F 110/12* | (2018.01) |
| *F24F 110/22* | (2018.01) |
| *F24F 110/32* | (2018.01) |

(52) U.S. Cl.
CPC ............. *G06Q 50/06* (2013.01); *F24F 11/30* (2018.01); *G05B 15/02* (2013.01); *G05B 19/048* (2013.01); *F24F 2110/12* (2018.01); *F24F 2110/22* (2018.01); *F24F 2110/32* (2018.01); *F24F 2130/10* (2018.01); *G05B 2219/2614* (2013.01); *G05B 2219/2642* (2013.01)

(58) Field of Classification Search
CPC ...... G06Q 50/06; F24F 11/30; F24F 2110/12; F24F 2110/22; F24F 2110/32; F24F 2130/10; F24F 11/47; F24F 2140/50; F24F 2140/60; F24F 11/64; G05B 15/02; G05B 19/048; G05B 2219/2614; G05B 2219/2642; G05B 2219/2639
See application file for complete search history.

(56) References Cited

U.S. PATENT DOCUMENTS

| | | | |
|---|---|---|---|
| 9,696,052 B2 * | 7/2017 | Malchiondo | ............. F24F 11/74 |
| 9,869,484 B2 * | 1/2018 | Hester | ...................... F24F 11/62 |
| 10,354,345 B2 * | 7/2019 | Sloop | ..................... G05B 15/02 |

(Continued)

*Primary Examiner* — Ramesh B Patel
(74) *Attorney, Agent, or Firm* — Faegre Drinker Biddle & Reath LLP

(57) ABSTRACT

An integrated system and method measures building characteristics and user behavior to provide real-time and forecasted utility usages and costs. The system gathers current and historical heating and cooling load data, compares the data with current and historical weather data and a building system set point, and calculates the heating or cooling load needed for the building based on the user's call for heat or cooling and the ambient environmental conditions. The system additionally analyzes individual device usage using usage signatures and user inputted tracking to create a comprehensive real-time and forecast of utility usages with the estimated costs. Through history of selections with usage changes corresponding to user input of individual devices, the system will be able to learn various devices' usage. The system then creates a comprehensive, real-time forecast of utility costs including the foregoing characteristics.

20 Claims, 3 Drawing Sheets

(56) References Cited

U.S. PATENT DOCUMENTS

| | | | | |
|---|---|---|---|---|
| 10,451,302 | B2* | 10/2019 | Lewis | F24F 11/58 |
| 10,809,675 | B2* | 10/2020 | Patel | G05D 23/1923 |
| 10,809,676 | B2* | 10/2020 | Patel | G05B 13/041 |
| 10,890,904 | B2* | 1/2021 | Turney | G06Q 10/20 |
| 11,036,249 | B2* | 6/2021 | ElBsat | G06Q 10/04 |
| 11,274,849 | B2* | 3/2022 | Bell | F24F 11/58 |
| 2014/0074542 | A1* | 3/2014 | Edens | G06Q 10/06315 705/7.25 |
| 2014/0350738 | A1* | 11/2014 | Angerame | G05F 1/66 700/291 |
| 2014/0365017 | A1* | 12/2014 | Hanna | F24F 11/30 700/276 |
| 2016/0201933 | A1* | 7/2016 | Hester | G05B 15/02 700/276 |
| 2016/0377309 | A1* | 12/2016 | Abiprojo | F24F 11/30 700/276 |
| 2017/0206615 | A1* | 7/2017 | Sloop | F24F 11/30 |
| 2018/0010818 | A1* | 1/2018 | Maruyama | G05B 15/02 |
| 2018/0348720 | A1* | 12/2018 | Bicknell | G05B 15/02 |
| 2019/0178518 | A1* | 6/2019 | Zimmerman | F24F 11/58 |
| 2019/0378020 | A1* | 12/2019 | Camilus | G06N 20/00 |
| 2020/0025402 | A1* | 1/2020 | Bell | G05D 23/1923 |
| 2020/0218233 | A1* | 7/2020 | ElBsat | G05F 1/66 |
| 2021/0285671 | A1* | 9/2021 | Du | G05B 13/048 |
| 2021/0359516 | A1* | 11/2021 | Hatamosa | H02J 13/00 |

* cited by examiner

SYSTEM AND METHOD FOR ENERGY FORECASTING BASED ON INDOOR AND OUTDOOR WEATHER DATA

CROSS REFERENCE TO RELATED APPLICATION

This application claims the benefit of U.S. Provisional Application Ser. No. 63/026,943, filed May 19, 2020 and entitled ENERGY COST PREDICTION SYSTEM, the entire disclosure of which is hereby expressly incorporated herein by reference.

BACKGROUND

1. Technical Field

The present invention relates to a method and system for energy optimization, and in particular, a method and system that gives live and forecasted usage and energy cost estimates.

2. Description of the Related Art

Households and businesses generally operate on a pay-as-you-go or budgeted basis for energy costs. In the pay-as-you-go model, the energy user generally receives a monthly statement assessing fees and costs for energy usage in the prior month. These monthly statements can vary widely depending on, for example, variability in heating and cooling costs. In the budgeted model, statements may be adjusted to assess approximately equal fees and costs each month, based on historical usage (e.g., over prior years) for a given building and customer.

Utility companies may also provide live utility pricing data in some places. Such live data is used to dynamically adjust the prices of energy, generally electricity, depending on daily demand variation. In the dynamic model, customers pay higher costs during periods of high demand and lower costs during periods of low demand.

What is needed is an improvement over the foregoing.

SUMMARY

The present disclosure is directed to an integrated system and method for measuring building characteristics and user behavior to provide real-time and forecasted utility usages and costs. The system gathers current and historical heating and cooling load data, compares the data with current and historical weather data and a building system set point, and calculates the heating or cooling load needed for the building based on the user's call for heat or cooling and the ambient environmental conditions. The system additionally analyzes individual device usage using usage signatures and user inputted tracking to create a comprehensive real-time and forecast of utility usages with the estimated costs. Through history of selections with usage changes corresponding to user input of individual devices, the system will be able to learn various devices' usage. The system then creates a comprehensive, real-time forecast of utility costs including the foregoing characteristics.

In one form thereof, the present disclosure provides a system for energy forecasting, the system including a thermostat configured to issue a setpoint signal indicative of a setpoint temperature, an indoor weather data monitor configured to issue an indoor weather signal indicative of at least one indoor weather parameter, an outdoor weather data monitor configured to issue an outdoor weather signal indicative of at least one outdoor weather parameter, and a controller configured to receive the setpoint signal, the indoor weather signal and the outdoor weather signal, the controller programmed to predict an energy usage of a structure based on the setpoint signal, the indoor weather signal and the outdoor weather signal.

In one form thereof, the present disclosure provides a method for energy forecasting including receiving a setpoint temperature, receiving an indoor weather parameter, receiving an outdoor weather parameter, and predicting an energy usage of a structure based on the setpoint temperature, the indoor weather parameter and the outdoor weather parameter.

In another form thereof, the present disclosure provides a system for energy forecasting, the system including a controller programmed to predict an energy usage of a structure, utility monitoring equipment configured for receiving energy usage data of at least one individual device, the controller configured to receive and integrate the energy usage data, an interface configured to receive an input from a user to identify activation of one of the at least one individual device and transmit it to the controller, and wherein the controller is configured to match a change in the energy usage data received from the utility monitoring equipment with the input from the interface.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
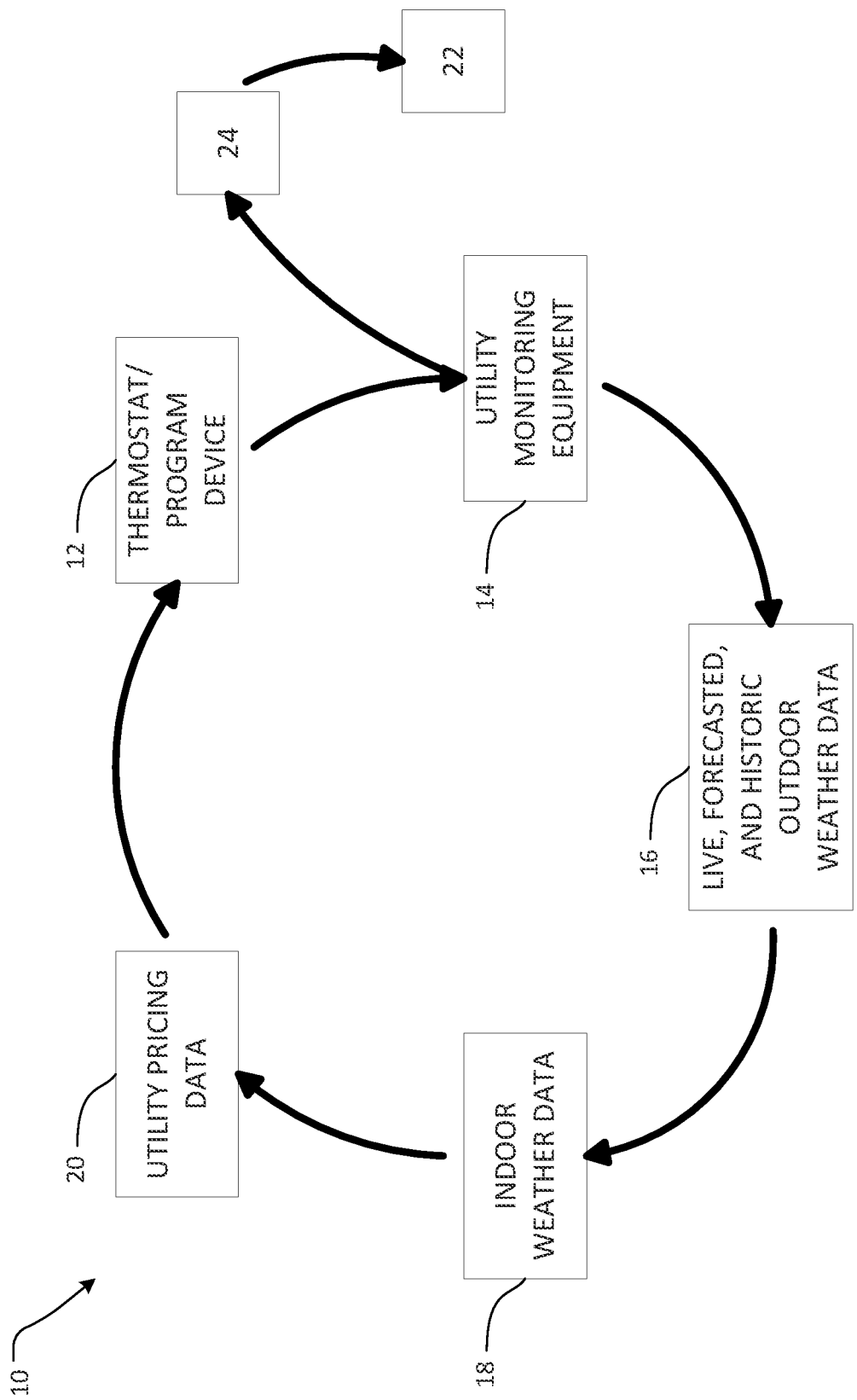
FIG. 1 is a flow chart describing the iterative method of giving live forecasting of utility costs.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise form disclosed.

DETAILED DESCRIPTION

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in detail, although it will be apparent to those skilled in the relevant art that some features that are not relevant to the present invention may not be shown for the sake of clarity.

The present disclosure is directed to a method and integrated system that gives live and forecasted usage and cost estimates for energy usage, including heating, ventilation, and air conditioning ("HVAC") systems.

As shown in FIG. 1, forecasting system 10 includes using a thermostat/program device 12, utility monitoring equipment 14, outdoor weather data 16, indoor weather data 18, and utility pricing data 20. These various components 12, 14, 16, and 18 create a feedback loop which culminates in the calculation of cost forecast 22. As described in detail below, the present system and method is iterative and can "learn" from patterns and user habits, which allows for increasingly accurate usage and cost predictions.

System 10 may include a programmable controller 24 having a memory and a processor configured to exchange and process data from the memory, which may be integrated into thermostat 12 or be a separate unit. In an exemplary embodiment, thermostat 12 may be located inside a user's home and programmed to accept user inputs for desired indoor temperature, selection of heating or cooling modes, and other user-oriented functions as required or desired for a particular application.

Controller 24 is also programmed to receive outdoor weather signals 16. These signals 16 may include live and forecasted national weather data, such as outdoor humidity, outdoor temperature, wind speed and wind direction. For example, controller 24 may have a remote data connection, such as a connection to the internet via a wireless or wired connection, and may retrieve from the national weather data from selected weather websites, national databases, or other desired sources. Outdoor weather signals 16 used by controller 24 may be the data pertinent to the area of the house or structure to which system 10 is applied, such as data limited by location. For example, outdoor weather signals 16 may be sorted by ZIP code and/or street address.

Controller 24 also receives signals 18 indicative of indoor weather, including temperature and humidity. Controller 24 also receives live usage signals from equipment 14 indicative of current energy usage, which may include energy usage by the components of the HVAC system and other electrical components and circuits of the household or business energy system. Controller 24 may additionally receive live usage signals from equipment 14 indicative of water usage by components including showers, sinks, washers, and any other applicable elements using water of the household or business system.

Controller 24 includes a comparator or series of comparators configured to compare the received live and forecasted outdoor weather data signals 16, the live indoor weather data signals 18, and the live usage signal from equipment 14 against respective thresholds. These comparisons may be weighted or otherwise aggregated, together with information pertaining to the house or structure to which system 10 is applied to determine how hard the HVAC system needs to work to maintain a current, user-desired temperature set point. Programmed information pertinent to the structure may include its level insulation, its air exchange rate (either by deliberate ventilation, "leakiness" or a combination thereof), and other factors pertinent to the structure's ability to retain a temperature differential compared to the outdoors.

Controller 24 of system 10 can therefore be used to understand much energy the HVAC system needs to maintain a desired indoor setpoint as a function of the temperature changes indoors and outdoors, as well as understand how much water the various components of the household or business system need to maintain recent usage profiles. To the extent that water may also be used for heating or cooling (e.g., for a humidifier or evaporative cooler), controller 24 may also calculate current and forecasted water usage to maintain a desired setpoint temperature and/or ambient indoor humidity. The program of controller 24 runs iteratively, such that it is constantly and repeatedly taking data points from the various received signals and running calculations in view of the current and forecasted outdoor temperature and indoor set point temperature. This allows controller 24 to "learn" by taking averages from previous data to continue to get more and more accurate as time goes on. For example, controller 24 may compare actual usage as indicated by utility monitor 14 to predicted usage and adjust its usage forecasting based on the comparison. The predicted usage may include a prediction for the next 60 days. In various embodiments, the predicted usage includes a prediction for a shorter or a longer amount of time than 60 days, but as the desired predicted time is increased, the accuracy in the forecast may decrease. In one exemplary embodiment, the programmed parameters pertinent to the structure (e.g., insulation value and air exchange rate) may be adjusted by controller 24 to reflect actual historical usage data in view of the prevailing weather conditions and setpoint temperatures at the time of data collection.

The comparison of live and forecasted usages, indoor weather, outdoor weather, pricings also allows for the accurate energy cost estimation. Referring still to FIG. 1, system 10 can also include pricing signal 20 indicative of the current, live energy pricing information. This information may be received directly from a utility company or a third party, e.g., via a remote data connection such as the internet. Pricing signal 20 may be indicative of a dynamically adjustable price, such that it provides a live utility unit price estimate. Thus, this parameter may be used in conjunction with usage data to provide a current and forecasted price. Similar to the prediction of the energy usage, the forecasted price may comprise a forecast for the next 60 days, but this time period may be shortened or extended based on the user's desired forecast range. The energy usage prediction and forecasted cost may be provided to the user via the internet, to an external device via wireless connection, through a display of controller, or through any other suitable method of exporting and displaying the data.

Live usage data, including the signal received from equipment 14, may be gathered by one or more energy monitoring devices integrated into controller 24 or another panel board, or may be gathered from signals issued by appliances themselves (e.g., air handlers, heat pumps, gas-fired furnaces etc.). Energy monitoring devices may be an electricity usage monitors, gas usage monitors, water usage monitors, or a combination thereof. Electricity usage monitors range from panel board monitors to load plug monitors, while gas monitors are use in heating and cooling systems that use gas, electricity, and/or water, such as, but not limited to, water heaters and dryers, and water monitors are used in systems using water, such as, but not limited to, sinks, showers, and washing machines. Electricity monitors, gas monitors, and water monitors may be used to monitor individual device being used in household or business system and are not limited to the foregoing examples. System 10 therefore can be used for energy predictions including electricity, gas, and water.

In various embodiments, system 10 includes more than one program device 12. Controller 24 may distinguish energy usage data, or usage signatures, integrated from utility monitoring equipment 14 from at least one program device 12 consuming energy, such that system 10 can be used for individual energy usage predictions for several program devices 12. In some embodiments, controller 24 distinguishes program device 12 energy consumption and usage data based on approximately simultaneous input from the user when program device 12 is activated. In these embodiments, controller 24 comprises an interface that is capable of receiving direct user input for indicating when program device 12 is activated, such as when it is turned on. Controller 24 is capable of matching the user input on the interface with an associated energy usage data change that is collected by utility monitoring equipment 14.

Figure 2:
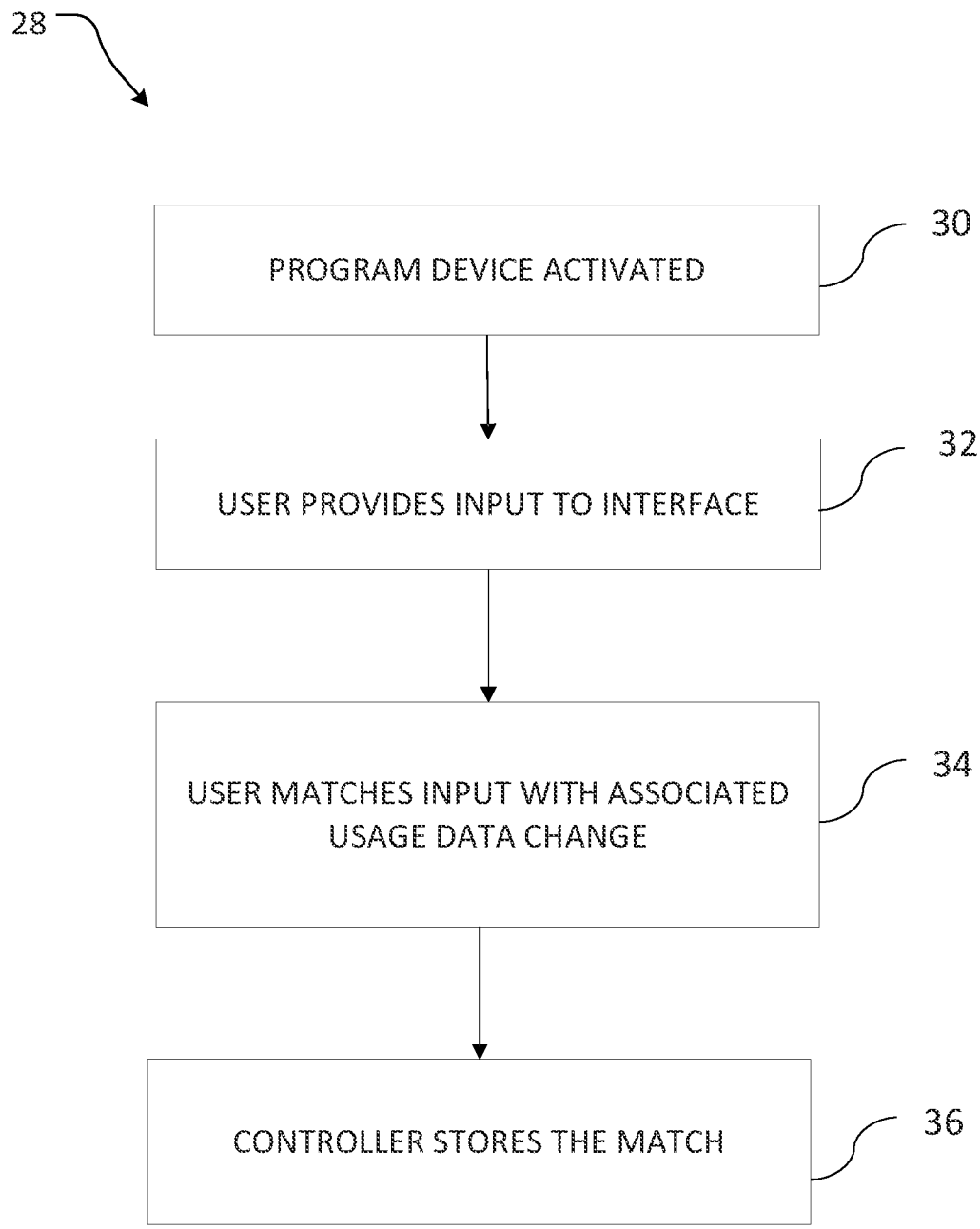
FIG. 2 is a flow chart describing a method of matching energy usage changes with particular energy-consuming devices.

FIG. 2 is a flow chart illustrating a method 28 that may be used in accordance with the present disclosure to accomplish "learning" the usage data for an individual device, such as program device 12. At block 30, the method first includes activation of program device 12, such as, but not limited to, a thermostat, refrigerator, heater, faucet, or any other suitable device that uses gas, electricity, or water. Activation may include the user turning on program device 12, or program device 12 turning on automatically. Then, at block 32, the user provides input to the interface on which program device 12 was activated. At block 34, the live usage data is displayed on the interface, and the user may directly select the change in the live usage data, also referred to as the usage signature, to match input of program device 12 with associated live usage data change. At block 36, controller 24 stores the match between the user selected data change and program device 12. In other embodiments, as will be described herein with reference to method 40 of FIG. 3, the user input may only indicate which program device 12 has been activated, but controller 24 may determine the associated change in the usage data.

Figure 3:
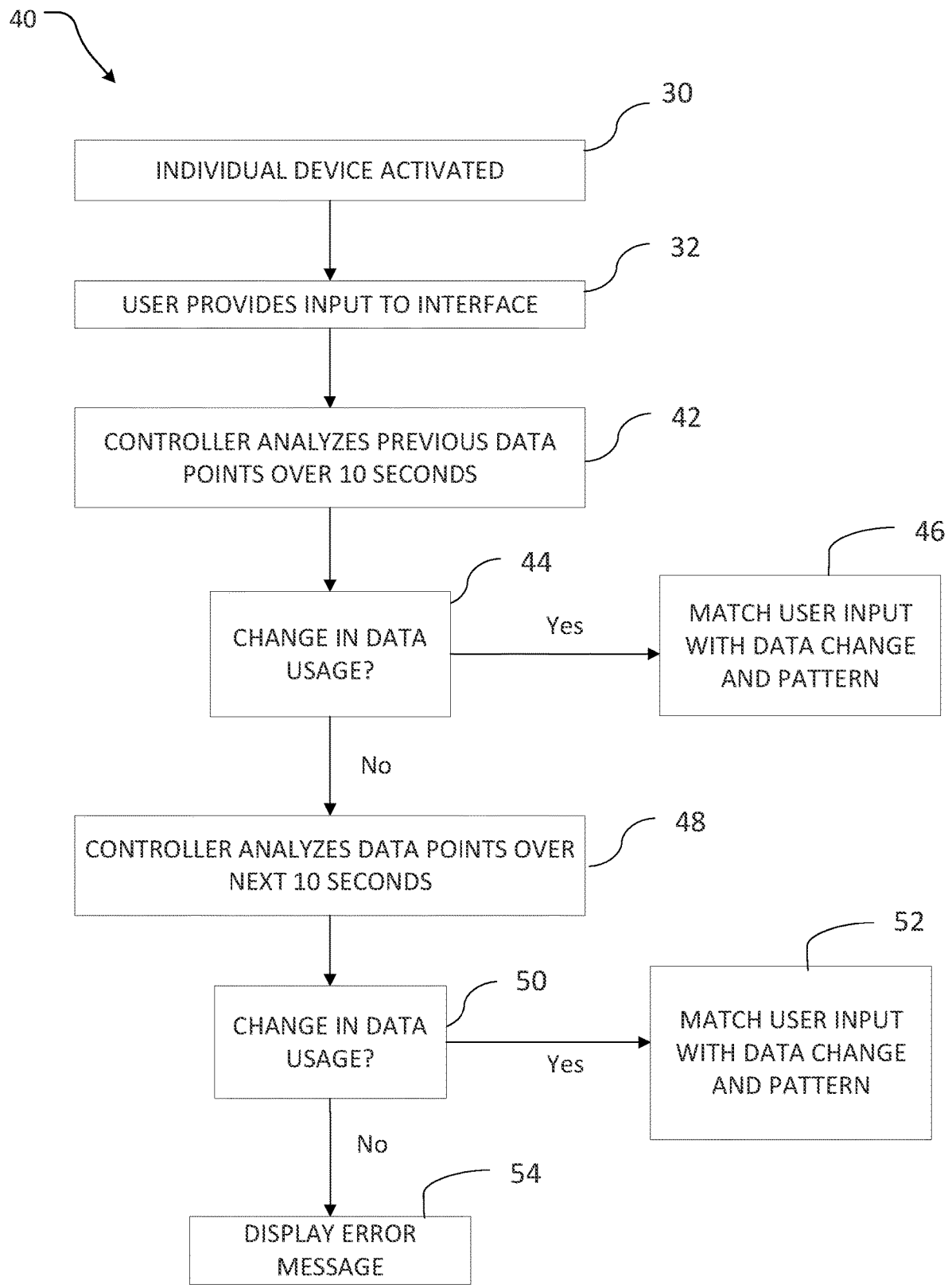
FIG. 3 is a flow chart describing another method of matching energy usage changes with particular energy-consuming devices.

The method 40 of FIG. 3 first includes block 30 in which the program device 12 is activated. At block 32, the method 40 in which the user provides input to the interface with an indication of the identity of the program device 12 activated.

At block 42, the method 28 includes wherein controller 24 analyzes the integrated usage data within a previous time span, such as a time span of 10 seconds. At block 44, controller 24 calculates if there was a substantial increase or change in the live usage data within that previous time span from the time point at which the user input was documented. During this step, controller 24 checks each discrete data value within the time period of 10 seconds and compares it to the data point just before it (e.g., in 1-second increments) and calculates the difference between the two data points. A substantial increase or change in the live usage data may occur when this calculated difference has a threshold value. The threshold may correspond to the expected energy usage change for a given site. For electrical appliances in a residence, for example, the threshold may be at least 50 watts to capture the activation of large appliances but ignore noisy electrical signals. If this is the case, method 40 proceeds to the arrow YES and proceeds to the step of block 46 wherein controller 24 matches the increased or changed energy usage to the user inputted activation of the program device 12. Controller 24 then stores the match of program device 12 and the usage data change. At this point, system 10 has "learned" the energy-usage profile corresponding to activation of a particular device, such as a refrigerator or furnace, based on the observed energy usage change around the time that the user has inputted the identity of the device and its change in state (i.e., activation). System 10 can monitor for future activation, deactivation or other change in state based on energy usage alone, and from the energy usage, system 10 can infer which devices have been changing states.

If controller 24 does not calculate a threshold increase or change in energy usage from a data point with reference to the prior data point for each data point over the "backward looking" time period (e.g., 10 seconds), method 40 continues along arrow NO. Method 40 proceeds to the step of block 48 wherein controller 24 looks forward in the live usage data with a time span, such as a span of 10 seconds. At block 50, controller 24 calculates if there was an increase in the live usage data within that subsequent time span. During this step, controller 24 compares each discrete data value within the time span and compares it to the data point just after it (e.g., in 1-second increments) and calculates the difference between the two. If the increase or change in the live usage data reaches the threshold change described above, controller 24 proceeds along pathway YES to block 52. At block 52, controller 24 matches the increased or changed usage data to the activation of the inputted program device 12 by the user. Controller 24 then stores this information. If no substantial increase or change is detected, method 40 advances along pathway NO to the step of block 54 wherein controller 24 may display an error message such as "No Device Detected." In various embodiments, controller 24 may look forward in the live usage data before looking backward, and may look backward into temporarily or permanently stored data after the forward-looking evaluation. Controller 24 may also look backward while it is simultaneously looking forward in real time. The initial direction that controller 24 evaluates may be specified by the user or may be a preprogrammed process in controller 24. While the methods 28 and 40 are described herein predominantly with reference to electric and gas energy consumption, they may be applied to the use with water consumption through the use of water usage monitoring equipment. In this way, water, gas, and electricity usage may all be incorporated in the comprehensive breakdown of program device 12 energy usage.

As a result of the both method 28 and method 40, controller 24 becomes able to identify program device 12 in the future based on its usage data, or usage signature, and can provide stored data of program device 12. This process can be repeated by the user with the same and/or various other individual program devices of system 10 several times, such that the iterative process provides controller 24 with a larger amount of values and controller 24 increases accuracy in identifying the correct individual program device that is running. Further, this allows controller 24 to gather information on the energy usage of a plurality of individual program devices, without requiring direct monitoring of the energy consumption patterns of each individual program device. Controller 24 may thus "learn" the individual device habits for future energy consumption prediction based on multiple identifications of the usage signatures.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for energy forecasting, the system comprising:
an indoor weather data monitor configured to issue an indoor weather signal indicative of at least one indoor weather parameter;
an outdoor weather data monitor configured to issue an outdoor weather signal indicative of at least one outdoor weather parameter;
a water usage data monitor configured to issue a water usage signal indicative of at least one water usage parameter; and
a controller configured to receive a setpoint signal, the indoor weather signal and the outdoor weather signal, the controller programmed to predict an energy usage of a structure based on the setpoint signal, the indoor weather signal and the outdoor weather signal, the controller further programmed to predict water usage of a structure based on the setpoint signal, indoor weather signal, and water usage data.

2. The system of claim 1, further comprising a thermostat configured to issue the setpoint signal indicative of a setpoint temperature.

3. The system of claim 2, wherein the thermostat is configured to receive a user input for adjustment of the setpoint temperature.

4. The system of claim 1, further comprising a usage monitor configured to issue a usage signal indicative of energy usage of at least one appliance, the controller receiving the usage signal and programmed to use the usage signal to compare actual usage to predicted usage and adjust forecasting based on the comparison.

5. The system of claim 4, wherein the at least one appliance comprises an HVAC component.

6. The system of claim 1, wherein the at least one indoor weather parameter includes at least one of indoor humidity and indoor temperature.

7. The system of claim 1, wherein the at least one outdoor weather parameter includes at least one of outdoor humidity, outdoor temperature, wind speed and wind direction.

8. The system of claim 7, wherein the at least one outdoor weather parameter includes both real-time and forecasted weather parameters.

9. The system of claim 1, wherein the controller includes a comparator configured to compare the indoor weather signal to the setpoint signal, in view of the outdoor weather signal to create the prediction of the energy usage.

10. The system of claim 9, wherein the controller is programmed to include at least one of an air exchange rate of the structure and an insulation value of the structure, the controller programmed to include at least one of the air exchange rate of the structure and the insulation value of the structure in the creation of the prediction of the energy usage.

11. The system of claim 10, wherein the controller is programmed to adjust the at least one of the air exchange rate of the structure and the insulation value of the structure to reflect actual historical usage data in view of prevailing weather conditions and setpoint temperatures at the time of data collection.

12. A method for energy forecasting comprising:
receiving a setpoint temperature;
receiving an indoor weather parameter;
receiving an outdoor weather parameter;
receiving a water usage parameter; and
predicting an energy usage and a water usage of a structure based on the setpoint temperature, the indoor weather parameter, the water usage parameter, and the outdoor weather parameter.

13. The method of claim 12, further comprising receiving an energy usage of at least one appliance, the step of predicting also based on a comparison of the energy usage to the setpoint temperature.

14. The method of claim 12, wherein the step of receiving at least one indoor weather parameter includes receiving at least one of indoor humidity and indoor temperature.

15. The method of claim 12, wherein the step of receiving at least one outdoor weather parameter includes receiving at least one of outdoor humidity, outdoor temperature, wind speed and wind direction.

16. The method of claim 12, further comprising comparing the indoor weather parameter to the setpoint temperature, in view of the outdoor weather parameter to accomplish the step of predicting the energy usage.

17. The method of claim 12, wherein the step of predicting the energy usage includes receiving and considering at least one of an air exchange rate of the structure and an insulation value of the structure.

18. The method of claim 17 further comprising adjusting the at least one of the air exchange rate of the structure and the insulation value of the structure to reflect actual historical usage data in view of prevailing weather conditions and setpoint temperatures at the time of data collection.

19. A system for energy forecasting, the system comprising:
a controller programmed to predict an energy usage and water usage of a structure;
utility monitoring equipment configured for receiving energy usage data of at least one individual device and water usage data, the controller configured to receive and integrate the energy usage data;
an interface configured to receive an input from a user to identify activation of one of the at least one individual device and transmit it to the controller; and
wherein the controller is configured to match a change in the energy usage data received from the utility monitoring equipment with the input from the interface and to predict water usage of the structure based on the energy usage data and water usage data.

20. The system of claim 19, wherein controller stores the match between the change in energy usage data and input from the user.

* * * * *